United States Patent Office 3,190,302
Patented June 22, 1965

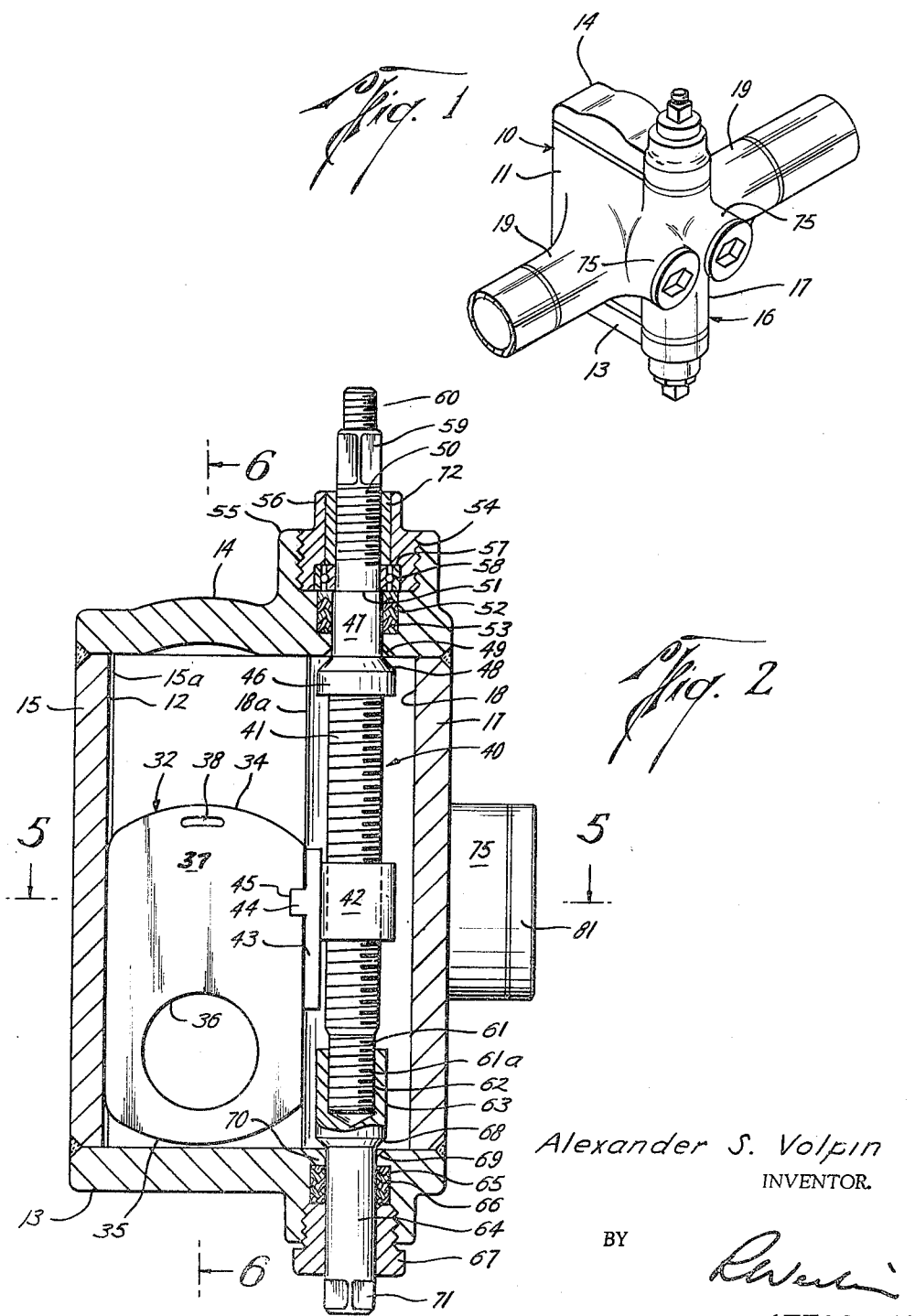

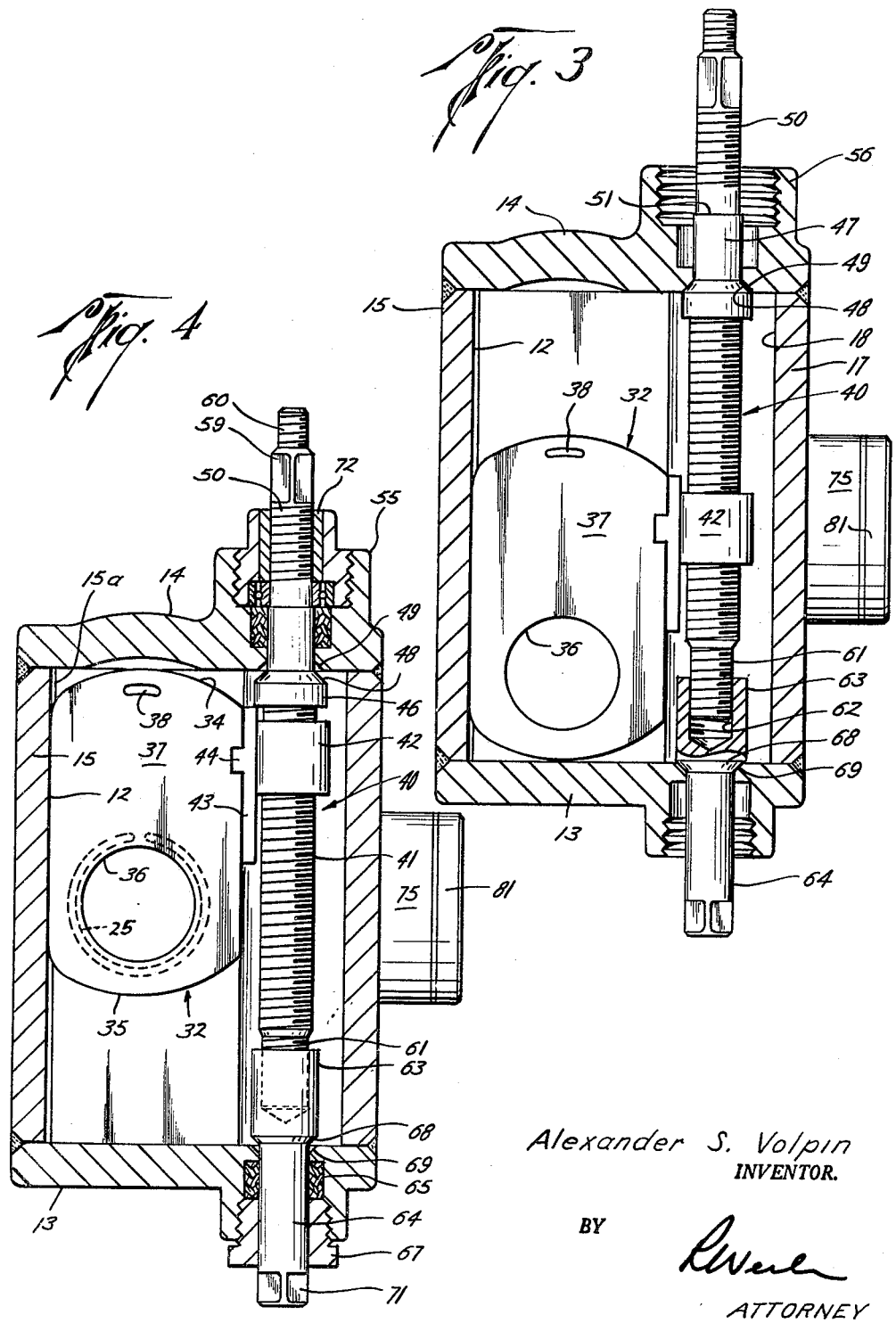

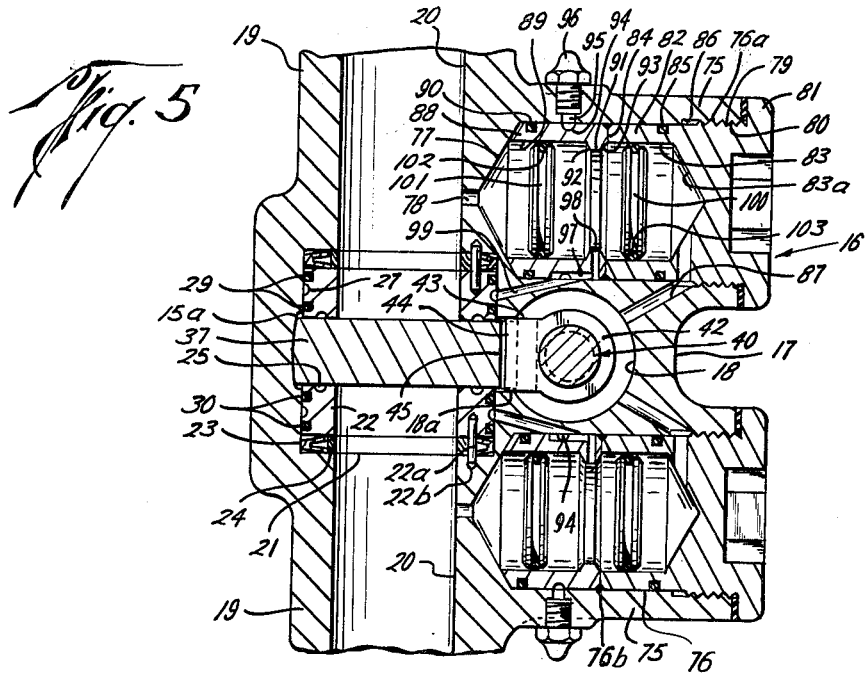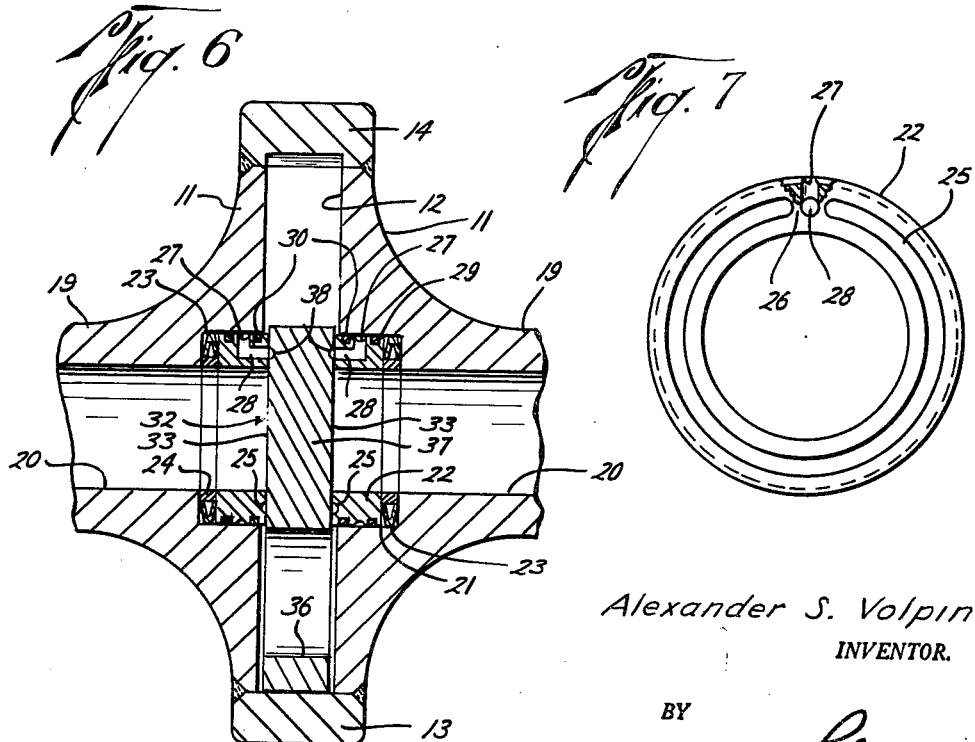

3,190,302
DUAL SEALED AUTOMATIC LUBRICANT
SEALED GATE VALVE
Alexander S. Volpin, 10200 W. Broadview Drive,
Miami Beach, Fla.
Filed Jan. 15, 1962, Ser. No. 166,165
7 Claims. (Cl. 137—246.12)

This invention relates to improvements in gate valves, and more particularly to automatic lubricant sealed gate valves.

In conventional automatic lubricant sealed gate valves, sealant systems are provided for the upstream and downstream side of the gate but are designed ordinarily to seal only one side of the gate; that is, the downstream side, the differential in pressure across the gate being employed to deliver sealant to the downstream side. Sealing systems are normally provided for both sides of the gate in order to permit sealing of the gate irrespective of its orientation in the conduit. This arrangement leaves one of the lubricant sealing systems, including the reservoir, more or less inactive once the valve has been installed, except in those relatively infrequent cases in which reversal in the direction of fluid flow may occur.

In many instances, it is found desirable to be able to seal both sides of the gate in the closed position regardless of the direction of the pressure differential.

It is a primary object of the present invention to provide a gate valve having automatic lubricant sealing for both sides of the closed gate irrespective of the direction of the pressure differential.

A more particular object is the provision of dual sealing systems including dual sealant reservoirs each communicating with one of the sealing groove systems on opposite sides of the gate, the reservoirs being provided with dual pistons which are independently and relatively movable in the reservoirs, the latter being provided with communicating passages leading to the gate seats, the gate chamber, and the flow passages, so that one of the pistons will be actuated by the differential pressure between the upstream passage and the gate chamber to seal the upstream side of the gate, while a piston in the other reservoir will be actuated by the differential pressure between the gate chamber and the downstream flow passage to seal the downstream side of the gate. By means of this arrangement the upstream and downstream sides of the gate will be automatically sealed simultaneously under all conditions when the gate has been moved to the closed position.

Another object of this invention is to provide an improved form of gate and stem connection arrangement for use in a gate valve wherein the gate is free-floating on the stem in such manner that it is not subject to stem torque during the opening and closing movements of the gate.

A further object is the provision in a through-conduit type gate valve of a novel, compact construction designed for high pressure, but of relatively light weight and low cost.

Still another object is to provide a pressure balanced stem for the gate which is re-packable in all gate positions without removal of the gate or stem from the valve housing.

An additional object is to provide in an automatic lubricant sealed gate valve, a reservoir construction employing dual pistons in which the pistons each engage metal seats at the opposite terminals of the strokes of the pistons to provide metal-to-metal seats at all terminal positions of the several pistons in order to provide improved sealing.

Other and more specific objects and advantages of this invention will become more readily apparent from the following detailed description when read in conjunction with the accompanying drawing which illustrates one useful embodiment in accordance with this invention.

In the drawing:

FIG. 1 is a perspective elevational view of the valve, showing the novel compact form of the valve;

FIG. 2 is a vertical transverse sectional view of the valve, showing the gate in the closed position;

FIG. 3 is a view similar to FIG. 2, showing the gate stem in the position for accomplishing repacking while the gate is in the closed position;

FIG. 4 is a view similar to FIG. 2, showing the gate in the open position;

FIG. 5 is a transverse cross-sectional view taken generally along line 5—5 of FIG. 2;

FIG. 6 is a fragmentary vertical cross-sectional view taken generally along line 6—6 of FIG. 2; and FIG. 7 is an elevational view of one of the gate seats.

Referring to the drawing, the valve comprises a body, designated generally by the numeral 10, of a relatively flat generally rectangular configuration, constructed preferably by welding or other suitable procedures, from plate-like parts. The body comprises a pair of end plates 11—11 of generally rectangular outline, spaced apart to define therebetween a relatively narrow gate chamber 12. The gate chamber is closed at its lower end by a bottom closure plate 13 and at its upper end by a bonnet plate 14. A side plate 15 closes one side of the chamber 12 and the opposite side of the chamber is closed by a back plate, designated generally by the numeral 16. The latter includes a vertically extending central portion of generally cylindrical configuration defining a stem housing 17 enclosing a generally cylindrical stem chamber 18 which communicates with gate chamber 12 throughout its length through a longitudinally extending slot 18a. End plates 11—11 are provided with oppositely extending flow nozzles 19—19 having registering flow ports 20—20 defining the flow passage through the valve. The outer ends of the flow nozzles may be finished for welding into a pipe line or may carry other conventional connection fittings (not shown) such as bolt flanges, threads, etc.

The inner ends of flow ports 20 are counterbored from their intersection with gate chamber 12 to form the annular recesses 21—21. Slidably seated in each of the recesses 21 is an annular seat member 22 which is resiliently urged outwardly of the recess toward chamber 12 by means of an annular spring 23 mounted in recess 21 behind the seat member. As each of the seat members and their related parts are identical, the description of one will be applicable to both. A spacer ring 24 is seated between the inward end of the seat member and the bottom wall of recess 21 to close the space occupied by the spring 23, the bore of spacer ring 24 being flush with the wall of flow port 20 and serving to prevent entrance of detritus carried by the fluids flowing through the valve into the space occupied by spring 24. Anchor dowels 22a project from the back faces of seat members 22 parallel to the axis of the seat members and seat in sockets 22b in the bottom walls of recesses 21 (FIG. 5) to lock the seat members against rotation in their respective recesses 21. The outer end face of the seat member is provided with a circular groove 25 which is interrupted by a short non-grooved space 26, as best seen in FIG. 7. A second groove 27 is provided about the exterior periphery of the seat member and communicates with the inner face of the seat member in non-grooved space 26 through an L-shaped passage 28 which extends radially inwardly from groove 27 into the body of the seat member and thence forwardly to the outer end face thereof. The diameter of passage 28 is less than the arcuate length of non-grooved portion 26 and, therefore, does not communicate directly with groove 25, for purposes which will be described more fully hereinafter. The outer periphery of the seat member is also provided with a pair of annular grooves 29—29 which encircle the exterior of the seat member on opposite sides of groove 27 and are adapted to receive packing member 30, such as conventional O-rings, for providing effective fluid-tight seals between the exterior of the seat member and the wall of recess 21.

A one-piece gate member, designated generally by the numeral 32, is mounted for longitudinal reciprocation in gate chamber 12. Gate member 32 is of flat elongate configuration, having a thickness somewhat less than the width of gate chamber 12 and defined by generally flat parallel sides 33—33, and having convexly curved upper and lower ends 34 and 35, respectively. The lower portion of gate member 32 is provided with a transverse conduit passage 36 which is adapted to register with flow ports 20—20 when the gate member is in the raised or valve opening position (FIG. 4). The upper portion 37 of the gate member is imperforate and forms a closure for the flow passage defined by flow ports 20—20 when the gate member is in the lower or valve-closing position (FIGS. 2, 3, and 6). The side faces 33 of the gate member are each provided near their upper ends and approximately centrally of the face with a short arcuate jumper recess 38 which is so positioned and has sufficient length that when the gate member is in the lower or valve-closing position, the recesses 38 will register with non-grooved sections 26 and the ends of passages 28 on the seat members and the opposite ends of recesses 38 will overlap the ends of groove 25, thereby placing grooves 25 into communication with passages 28 to thereby complete communication throughout grooves 25 by bridging sections 26, for purposes which will become apparent hereinafter. The width of gate member 32 is preferably made such that one longitudinal edge will project into slot 18a while the other will be received in a longitudinal guide groove 15a provided in the inner wall of side plate 15.

A gate stem designated generally by the numeral 40, is longitudinally disposed in stem chamber 18 for rotation therein and has externally threaded section 41 on which is mounted an internally threaded drive collar 42 which, in turn, carries a vertically disposed arm 43 disposed in slot 18a and facing gate chamber 12. Arm 43 carries, near its upper end, a transverse forwardly extending key 44 which is adapted to be received freely in a correspondingly shaped transverse slot 45 formed in the side edge of gate member 32 adjacent slots 18a near the upper end portion thereof. Key 44 is substantially the same width of gate member 32 having thereby a small degree of clearance relative to slot 18a, the walls of which cooperate with the ends of key 44 and arm 43 to prevent rotation of drive collar 42. By this arrangement, it will be seen that by rotation of gate stem 40, which is of the non-rising type, drive collar 42 will be caused to move up or down, depending upon the direction of rotation of the stem. This movement of the drive collar will, in turn, reciprocate gate member 32. The form of connection between the drive collar and the gate member provided by the key-and-slot connection, described above, will obviate any twisting effect on the gate member as a result of stem torque produced during rotation of the stem. Thus, the gate member will be floating, in effect, in its movements relative to the gate stem. By this arrangement, binding of the gate member between the walls of the gate chamber, as a result of twisting through stem torque, will be completely obviated and the gate member amy thus reciprocate freely and with a minimum amount of actuating force.

Gate stem 40 is provided at the upper end of threaded section 41 with a short enlargement 46 which merges with a reduced diameter non-threaded cylindrical portion 47 by means of a bevelled shoulder 48. The latter is adapted to seat in a correspondingly bevelled seat 49 formed in the bottom face of bonnet plate 14. A further reduction in diameter is provided in stem section 47 to define the upper end portion 50 of the stem and the upwardly facing annular shoulder 51 between the portions 47 and 50. Portions 47 and 50 of the stem extend through a stuffing box 52 formed in bonnet plate 14, and packing 53 is disposed in the stuffing box about stem section 47. Stuffing box 52 communicates with an internally threaded socket 54 provided in an upwardly extending boss 55 formed integrally with bonnet plate 14 and a gland nut 56 is screwed into socket 54 about upper stem section 50. The inner end of nut 56 is provided with an annular recess 57 adapted to receive an antifriction bearing 58 surrounding stem portion 50 and resting on the bottom of socket 54 for reducing the torque required for turning gate stem 40. A sleeve 72 is threaded on section 41 of the stem as a holddown for bearing 58 and as a filler for the annular space between nut 56 and stem section 50. The upper end portion of stem section 50, which projects from boss 55, is provided with flats 59 for engagement by an operator, such as a conventional hand wheel or mechanical operator (not shown), by means of which the gate stem may be turned, stem portion 50 terminating in a threaded extension 65 for reception of a net (not shown) for locking the operator on the stem. The lower end of stem 40 is reduced somewhat in diameter to form the pin 61 which is provided with external threads 61a for threaded reception in a threaded socket 62 provided in the end of a co-axial stem extension 63. Threads 61a are made finer than the threads on stem section 41. Stem extension 63 includes a reduced diameter portion 64 which projects through an opening 70 in bottom plate 13, passing through a stuffing box 65 having seal packing 66 therein about portion 64. A gland nut 67 is screwed into stuffing box 65 about stem portion 64 for compressing the packing about the stem portion. The reduction in diameter of stem extension 63 to form portion 64 defines the bevelled shoulder 68 therebetween which is complementary to a bevelled seat 69 formed in the inner face of bottom plate 13 about the opening through which reduced diameter portion 64 projects. The outer end of portion 64 is provided with flats 71 for the reception of a wrench or other turning tool.

The two-part stem construction described provides means operable in conjunction with the cooperation of bevelled shoulders 48 and 68 with their respective seats 49 and 69 to enable re-packing of the valve stem while the valve is under line fluid pressure and whether the gate member is in its open or closed position. This may be accomplished, for example, with the gate member in the fully open position, as best seen in FIG. 3, by the following series of steps: Gland nut 56 is backed out of socket 54 an amount to permit stem 40 to move upwardly a sufficient distance to bring shoulder 48 in tight metal-to-metal engagement with seat 49. Stem extension 63 will then be turned to turn stem 40 relative to drive collar 42 in a direction to cause stem 40 to move upwardly until shoulder 48 engages seat 49, thereby stopping further upward movement of the stem. When this occurs, continued rotation of extension 63 will back the latter off of pin 61 until shoulder 68 engages seat 69, thereby forming a metal-to-metal seal between these parts. By making threads 61a finer than the threads on stem section 41, this sequence of operations will be assured. The degree of tightness of these seals will be controlled by the extent to which extension 63 is rotated. When both ends of the stem are thus sealed, one or both of the gland nuts 56 and 67 may be completely unscrewed and the packing replaced in either or both stuffing boxes as desired. FIG. 3 shows the stem sealed at both ends and with the packing structures fully removed.

It will be evident that the same operations can be conducted with the valve in the fully closed position as seen in FIG. 4.

The valve is provided with dual automatic lubricant sealing systems, each cooperating with the sealant grooves in one of the seats 22. As these systems are identical, only one will be described in detail. These systems are mounted in a pair of horizontally disposed tubular bosses 75—75 projecting outwardly from back plate 16 on opposite sides of stem housing 17, as best seen in FIGS. 1 and 5. Boss 75 has a bore 76 provided with a conical bottom 77 communicating through a passage 78 with the adjacent flow port 20. The outer end of bore 76 is counterbored at 76a and the outer portion of the counterbore is internally threaded at 79 to receive the threaded shank 80 of a closure cap 81. The latter has an integrally formed tubular extension 82 having a bore 83 terminating in a conical bottom 83a in shank 80. Extension 82 has a close sliding fit in bore 76 and has a length such as to extend about midway of bore 76, the inner end of extension 82 defining the generally flat end face 84. A packing ring 85, such as a conventional O-ring, is seated in the exterior of extension 82 to seal with the wall of bore 76. Counterbore 76a is made somewhat larger than threaded shank 80 to provide an annular recess 86 between the bottom of counterbore 76a and the engaged threads 79, 80. Recess 86 communicates with a passage 87 which extends through the wall of central portion 17 into communication with stem chamber 18.

Slidably seated in the inner portion of bore 76 between bottom wall 77 and end face 84 of extension 82 is a tubular sleeve 88 having a through bore 89 communicating with bore 83. Bores 83 and 89 comprise the sealant reservoir. The inner end of sleeve 88 is tapered to seat on bottom wall 77 and the outer end of sleeve 88 abuts end face 84 and is welded thereto at 76b. A packing ring 90, such as a conventional O-ring, is seated in the exterior of sleeve 88 near its inner end to seal with the wall of bore 76. The outer end of sleeve 88 is provided with an inwardly turned annular lip 91 having bevelled inner and outer faces forming annular seats 92 and 93, respectively, in the adjacent ends of bores 83 and 89. An annular groove 94 is provided in the exterior of sleeve 88 between packing 90 and the outer end of the sleeve. A sealant supply passage 95 extends through the wall of boss 75 and communicates with groove 94. A pressure fitting 96 of conventional form is mounted in passage 95 for supplying sealant to passage 95 and groove 94. The exterior of sleeve 88 is provided with a short longitudinal slot 97 which communicates groove 94 with a port 98 which opens through lip 91 into the communicating bores 83 and 89. Thus, sealant supplied through passage 95 to groove 94 will flow through the latter and thence via slot 97 and port 98 into the reservoir comprising bores 83 and 89. A passage 99 through the wall of the stem housing communicates slot 97 with groove 27 in the related seat member 22.

Barrier pistons 100 and 101 are slidably disposed in bores 83 and 89, respectively, and are provided with peripheral packings 102 and 103, respectively, to form slidable seals with the walls of the respective bores. The opposite ends of piston 100 have beveled edges adapted to seat tightly against bottom wall 83a and seat 93 at the opposite ends of its travel path in bore 83. Piston 101 has similarly bevelled end edges to seat tightly against bottom wall 77 and shoulder 92 at the opposite ends of its travel in bore 89.

Operation of the valve is as follows:

Since the valve structure is completely symmetrical, the valve may be connected into a pipe line with either end being the upstream end and the other the downstream end. It will also be assumed that sealant has been introduced into both reservoirs, the sealant entering bores 83 and 89 through ports 98, as previously described, in a sufficient volume to force pistons 100 and 101 to the outermost terminals of their travel. In this condition, piston 100 will be seated against bottom wall 83a and piston 101 against bottom wall 77. It will be assumed, for purposes of illustration, that flow is in the direction indicated by the arrows in FIG. 5. Assuming also that gate member 32 is in its lowermost or closed position, jumper recesses 38 will place sealant grooves 25 into communication with grooves 27 and through the latter with passage 99, slot 97, and port 98 with the interior of bores 83 and 89. The upstream pressure will act against seat 22 and in cooperation with the force of the related spring 23 will urge the seat into close sealing engagement with the upstream side of gate member 32. At the same time the upstream pressure will enter through upstream passage 78 into the inner end of bore 76 and will be exerted against the inner end of piston 101. As a result of the at least momentary differential between the upstream pressure and the downstream pressure in the gate chamber, piston 101 will be forced outwardly in bore 83 thereby forcing sealant through upstream port 98, slot 97 and passage 99 and thence into upstream groove 25, thus causing automatic lubricant sealing of the upstream side of the gate member. As this occurs, there will be some leakage of line pressure into the gate chamber and the resulting pressure differential relative to the downstream pressure will be exerted through passage 87 of the downstream system against the outer end of downstream piston 100 to move the downstream piston 100 inwardly of its reservoir, forcing lubricant outwardly through port 98, slot 97 and passage 99 of the downstream system into groove 27 of the downstream seat, and thence through passage 28 and jumper recesses 38 into sealing grooves 25, thereby effectively and automatically sealing the downstream side of the gate. In addition to the lubricant sealing thus effected for both sides of the gate member, springs 23 will, at all times, urge the seat members toward the opposed sides of the gate member thereby aiding in maintaining the seals.

The dual arrangement of the pistons in each of the sealant reservoirs also provides means for sealing off each portion of the reservoir by the engagement of the piston ends with the opposite ends of bores 83 and 88. This assures against leakage of pressure from one of the reservoir sections to the other, even when all of the sealant may have been used up. Thus, piston 101 at one end of its movement will seal with seat 92 and at the other end of the stroke will seal with bottom wall 77. Similarly, piston 101 will seal at one end of its stroke with seat 93 and at the other with bottom wall 83. Thus, there can be no escape of pressure from one side of the valve to the other irrespective of the direction of the pressure differential which may occur. This assures efficient operation of the valve under all conditions of pressure variation to which it may be exposed during use.

From the foregoing it will be seen that I have provided an automatic lubricant sealed gate valve construction which includes dual-sealing systems for simultaneously sealing both sides of a gate valve under all differential pressure conditions which may occur during use of the valve; and which also includes other novel and useful features of body and gate constructions; and gate-actuating mechanisms.

It will be understood that numerous modifications and changes may be made in the details of the illustrative embodiment within the scope of the appended claims, but without departing from the spirit of this invention.

What I claim and desire to secure by Letters Patent is:

1. An automatic lubricant sealed gate valve including a housing having a gate chamber therein, upstream and downstream flow ports communicating with said chamber, a gate member movable in said chamber relative to the inner ends of said flow ports, sealant grooves disposed about the upstream and downstream flow ports between the related flow port ends and adjacent gate faces, and means for automatically sealing both the upstream and downstream sides of the gate member substantially simultaneously, said means comprising, a separate sealant reservoir communicating with each of said grooves for supplying sealant thereto, a first movable barrier in each reservoir responsive to the differential between the pressure in the upstream flow port and the pressure in said chamber to deliver sealant only to the upstream groove, a second and separate movable barrier in each reservoir responsive to the differential between the pressure in said chamber and the pressure in the downstream flow port to deliver sealant only to the downstream groove, and means for introducing sealant into said reservoirs.

2. An automatic lubricant sealed gate valve including a housing having a gate chamber therein, upstream and downstream flow ports communicating with said chamber, a gate member movable in said chamber relative to said flow ports, seat members in the inner ends of said flow ports cooperating with the opposite sides of the gate member, sealant grooves disposed about the upstream and downstream flow ports between the related seats and adjacent gate faces, and means for automatically sealing both the upstream and downstream sides of the gate member substantially simultaneously, said means comprising, a separate sealant reservoir communicating with each of said grooves for supplying sealant thereto, a first movable barrier in each reservoir responsive to the differential between the pressure in the upstream flow port and the pressure in said chamber to deliver sealant only to the upstream groove, a second and separate movable barrier in each reservoir responsive to the differential between the pressure in said chamber and the pressure in the downstream flow port to deliver sealant only to the downstream groove, and means for introducing sealant into said reservoirs.

3. An automatic lubricant sealed gate valve including a housing having a gate chamber therein, upstream and downstream flow ports communicating with said chamber, a gate member movable in said chamber relative to said flow ports, axially movable annular seat members in the inner ends of said flow ports resiliently biased toward and cooperating with the opposite sides of the gate member to initially seal therewith about the respective flow ports, sealant grooves disposed about the upstream and downstream flow ports between the related seats and adjacent gate faces, and means for automatically sealing with lubricant sealant both the upstream and downstream sides of the gate member substantially simultaneously, said means comprising, a separate sealant reservoir communicating with each of said grooves for supplying sealant thereto, a first movable barrier in each reservoir responsive to the differential between the pressure in the upstream flow port and the pressure in said chamber to deliver sealant only to the upstream groove, a second and separate movable barrier in each reservoir responsive to the differential between the pressure in said chamber and the pressure in the downstream flow port to deliver sealant only to the downstream groove, and means for introducing sealant into said reservoirs.

4. In an automatic lubricant sealed gate valve, a housing having a gate chamber therein, upstream and downstream flow ports communicating with said chamber, a gate member movable in said chamber relative to said flow ports, seat members in the inner ends of the flow ports cooperating with the opposite sides of the gate member, sealant grooves disposed about the upstream and downstream flow ports between the related seats and the adjacent gate faces, a separate sealant reservoir for supplying sealant to each of said grooves, a pair of barrier members in each reservoir relatively and independently movable therein, means to introduce sealant into each reservoir between the barriers, a first passage means communicating each of said reservoirs from a point between the barriers with one of said grooves, a second passage means communicating upstream pressure to the portion of each said reservoir outside one of said barriers, and a third passage means communicating the portion of each said reservoir outside the other barrier with said chamber.

5. In an automatic lubricant sealed gate valve, a housing having a gate chamber therein, upstream and downstream flow ports communicating with said chamber, a gate member movable in said chamber relative to said flow ports, seat members in the inner ends of the flow ports cooperating with the opposite sides of the gate member, sealant grooves disposed about the upstream and downstream flow ports between the related seats and the adjacent gate faces, a separate sealant reservoir for supplying sealant to each of said grooves, a pair of barrier members in each reservoir relatively and independently movable therein, means to introduce sealant into each reservoir between the barriers, a first passage means communicating each of said reservoirs from a point between the barriers with one of said grooves, a second passage means communicating upstream pressure to the portion of each said reservoir outside one of said barriers, a third passage means communicating the portion of each said reservoir outside the other barrier with said chamber, and stop means limiting the extent of movement of each of said barriers in opposite directions, said stop means comprising seats cooperating the opposite ends of each barrier to form seals controlling pressure communication between the several said passage means.

6. In an automatic lubricant sealed gate valve, a housing having a gate chamber therein, upstream and downstream flow ports communicating with said chamber, a gate member movable in said chamber relative to said flow ports, axially movable annular seat members in the inner ends of the flow ports resiliently biased toward and cooperating wtih the opposite sides of the gate member to initially seal therewith about the respective flow ports, sealant grooves disposed about the upstream and downstream flow ports between the related seats and the adjacent gate faces, and automatic sealant supply means for said grooves comprising, a separate sealant reservoir for supplying sealant to each of said grooves, a pair of barrier members in each reservoir relatively and independently movable therein, means to introduce sealant into each reservoir between the barriers, a first passage means communicating each of said reservoirs from a point between the barriers with one of said grooves, a second passage means communicating upstream pressure to the portion of each said reservoir outside one of said barriers, and a third passage means communicating the portion of each said reservoir outside the other barrier with said chamber.

7. In an automatic lubricant sealed valve including a housing having a closure chamber therein, flow ports communicating with said closure chamber, a closure member in the closure chamber cooperating with said flow ports to define sealing surfaces therebetween about said flow ports, and means for supplying sealant to said sealing surfaces, comprising, chamber means supported on the housing, a pair of relatively and independently movable barrier means slidably disposed in said chamber means, means to introduce sealant into the chamber means between said barriers, passage means connecting the space between the barriers to said sealing surfaces, first conduit means for directing upstream fluid pressure to bear directly on only one of said barriers, and second conduit means for directing pressure fluid from said closure chamber to bear directly on only the other of said barriers.

References Cited by the Examiner

UNITED STATES PATENTS

| | | | |
|---|---|---|---|
| 260,936 | 7/82 | Callahan | 251—266 |
| 1,751,122 | 3/30 | Barker | 251—266 |
| 2,854,209 | 9/58 | Erwin | 251—329 XR |
| 2,868,221 | 1/59 | Eichenberg et al. | 137—246.12 |
| 2,956,580 | 10/60 | Heath | 137—246.12 |
| 3,033,224 | 5/62 | Jones | 137—246.12 |
| 3,095,004 | 6/63 | Jackson et al. | 137—246.11 |

FOREIGN PATENTS 590,178   1/60   Canada.

ISADOR WEIL, *Primary Examiner.*

M. CARY NELSON, *Examiner.*